United States Patent [19]

Hasegawa et al.

[11] Patent Number: 5,097,329
[45] Date of Patent: Mar. 17, 1992

[54] PROCESS FOR JUDGING A RUNWAY

[75] Inventors: Hiroshi Hasegawa, Niiza; Ryoji Igarashi, Kasukabe, both of Japan

[73] Assignee: Honda Giken Kogyo Kabushiki Kaisha, Tokyo, Japan

[21] Appl. No.: 501,098

[22] Filed: Mar. 28, 1990

[30] Foreign Application Priority Data

Mar. 30, 1989 [JP] Japan .................. 1-79727
Oct. 6, 1989 [JP] Japan ................. 1-261666

[51] Int. Cl.⁵ .................. H04N 7/00; H04N 7/18
[52] U.S. Cl. ..................... 358/125; 358/103; 358/107; 382/8
[58] Field of Search ............. 358/109, 125, 103, 107; 901/44; 382/8

[56] References Cited

U.S. PATENT DOCUMENTS

| 4,299,483 | 11/1981 | Grove et al. ............ 358/109 |
| 4,746,977 | 5/1988 | White ..................... 358/103 |
| 4,790,402 | 12/1988 | Field et al. ............ 358/103 |
| 4,981,372 | 1/1991 | Morimoto et al. ....... 358/107 |

Primary Examiner—John K. Peng
Attorney, Agent, or Firm—Lyon & Lyon

[57] ABSTRACT

A process for judging a runway on a two-dimensional image display presenting image information obtained by taking a picture of the runway. The process comprises, a first step of setting a first window and a second window for scanning and tracing required parts of the runway on the image display, and setting a third window interlocked with the first and the second windows in a set positional relationship therewith, and a second step of, when the third window detects a required part of the runway, setting addition location of the scanning area of the third window to the surrounding area of the required part of the runway.

18 Claims, 15 Drawing Sheets

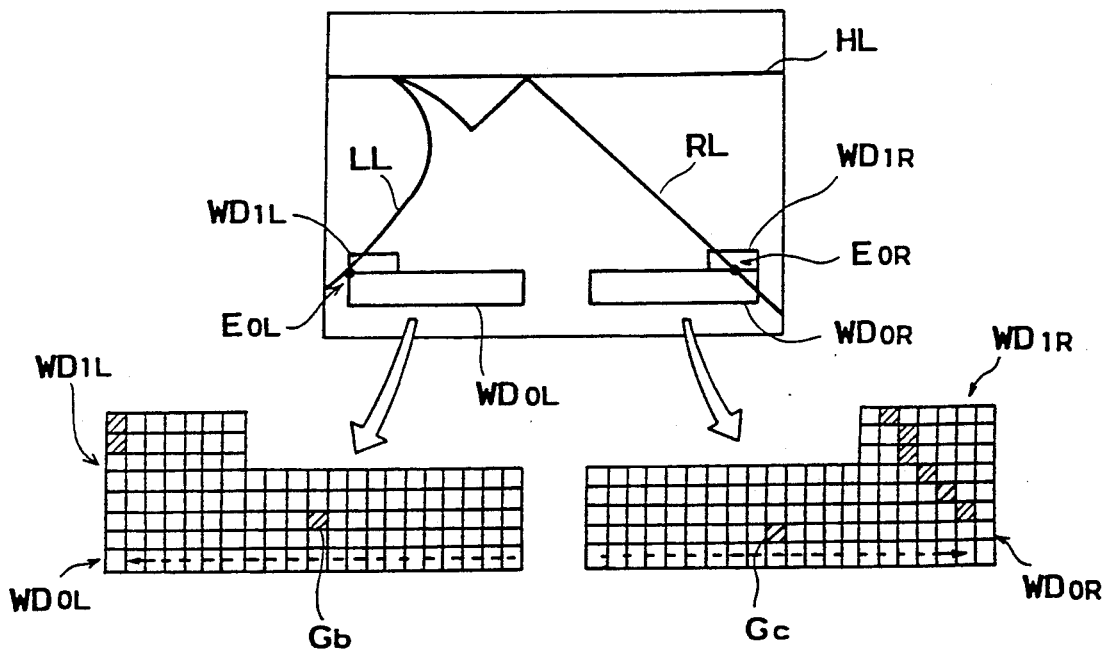

Fig. 15B
Fig. 15A
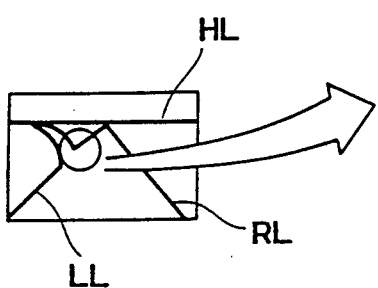
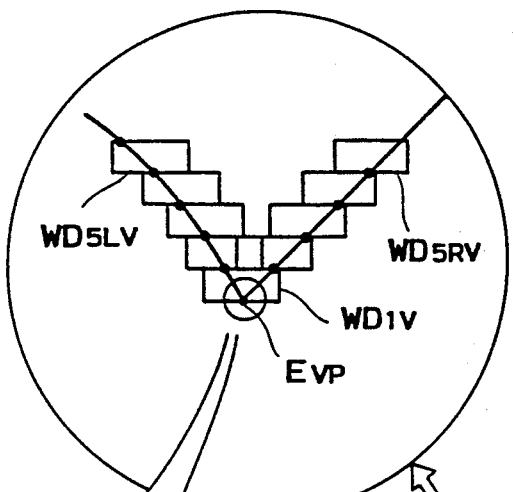
Fig. 15D
Fig. 15C
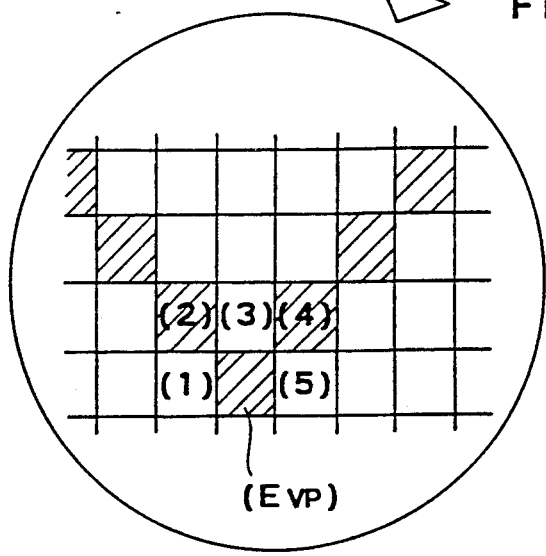
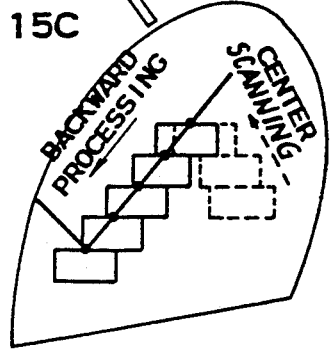

PROCESS FOR JUDGING A RUNWAY

BACKGROUND OF THE INVENTION

This invention relates to a runway judging process, specifically to a process for judging the contour or direction of the runway, based on image information obtained by taking a picture of the runway.

To drive a vehicle (e.g., automobile) automatically on a runway (e.g., road), it is necessary to recognize and judge the contour of the road in real time. In such a conceivable runway judging process, for example, a road ahead of an automobile is pictured by a TV camera, or the like, and the obtained data is image-processed.

FIGS. 1A-F show image displays of roads whose contours are to be judged. In FIGS. 1A-F, HL indicates a horizon, and RL and LL indicate the right and the left edges of the road respectively. SR represents a fork in the road. Contours of the road are a straight road (FIG. 1A), a curved road (FIG. 1B), a forked road (FIG. 1C), a branch divided from a main road FIG. 1D, and branches joined to main roads (FIGS. 1E and F).

It is not easy to recognize such variations of the contour of a runway.

In a conceivable process, for example, the edges corresponding to the sides RL, LL of a runway are extracted at the lower end of an image display, i.e., on the foreground of a road, and based on the extracted result, the sides RL, LL are traced upward on the image display, i.e., forward of the runway. But it is very difficult to recognize the branches exemplified in FIGS. 1C and D by this process.

When a recognition error takes place at the start or in the course of image data processing for the recognition, it becomes impossible to judge the contour of a road. Here it is assumed that the process in which the edges corresponding to the sides of a runway are extracted at the lower end of an image display of the road, i.e., in the foreground of the road, and based on the extracted result, the right and the left sides of the road are traced upward on the image display, i.e., forward of the road, is used. In this process, for example in FIG. 1D, when the edge corresponding to the left side of the road is discontinous, it is impossible to trace the left edge upward on the image display.

A first object of this invention is to provide a runway judging process which can judge variations of the contour of a runway easily and with high precision.

A second object of this invention is to provide a runway judging process which can judge variations of the contour of a runway with no errors and easily.

SUMMARY OF THE INVENTION

The runway judging process according to a first aspect of this invention is for judging a runway on a two-dimensional image display presenting image information obtained by taking a picture of the runway, the process being characterized by the first step of setting a first window and a second window for scanning and tracing required parts of the runway on the image display, and setting a third window interlocked with the first and the second windows in a set positional relationship therewith; and the second step of, when the third window detects a required part of the runway, expanding a scanning area of the third window to the surrounding of the required part of the runway. This runway judging process may be characterized by the second step of, when the third window detects the required part, expanding its scanning area to the surrounding thereof to detect a V-shape.

According to this runway judging process, local areas defined by the first to the third windows are processed, and accordingly the data to be processed is decreased. The expansion of the scanning area of the third window facilitates judging variations of the contour of a runway.

The runway judging process according to a second aspect of this invention is characterized in that right and left windows are set respectively at the right and the left sides of the runway in the foreground of the image display, and moving the right and the left windows forward along the sides in the direction of the runway for scanning and tracing the runway, while setting a central window intermediate between the right and the left windows for scanning a different edge of the runway. When the central window detects a different edge of the runway, the central window is set at a downward position of the image display (rearward of the runway) to scan and trace the detected different edge. This runway judging process may be characterized in that when the central window detects the runway, the central window is set at a downward position of the image display (rearward of the runway) to scan and trace the runway, and when the third window detects the vertex of the V-shape, the scanning and tracing is branched to the right and to the left.

According to this runway judging process, the edges of a runway are scanned by setting right, left and central windows, and accordingly the data to be processed is decreased, and the processing is speeded up. The processing operations by these windows (small areas) are accumulated to recognize the entire contour of a runway, with a result that the runway can be judged with high precision. When the central window detects a different edge, the backward processing is conducted, with a result that various contours of runways can be judged accurately and easily. A V-shape is detected by the backward processing performed when the central window has detected variations of the contour of a road, whereby divided branches and joining branches can be detected easily.

The runway judging process according to a third aspect is for judging a runway on a two-dimensional image display presenting image information obtained by taking a picture of the runway, the process being characterized by the first step of setting a first window and a second window for scanning and tracing required parts of the runway on the image display, and setting a third window interlocked with the first and the second windows in a set positional relationship therewith; and the second step of, when the third window detects a required part of the runway, expanding a scanning area of the third window to the surrounding area of the required part so as to detect possible errors of the scanning of the required parts conducted by the first and the second windows.

According to the runway judging process, local areas of first to third windows are to be processed, and accordingly processing data is decreased. The third window can be expanded to scan errors made by the first and the second windows, with a result that the contour of a road can be judged accurately and easily.

The process for judging a runway according to a fourth aspect is characterized in that right and left windows respectively on the right and the left sides of the runway on the image display, additional right and left windows are set sequentially in the direction of run of the runway to scan and trace the runway, while a central window is set intermediate between the right and the left windows to scan a different edge of the runway. This process is further characterized in that when the central window detects the different edge, a central window is set at a downward position on the image display (rearward of the runway) to scan and trace the detected different edge to detect scanning errors made by the right and the left windows.

According to this runway judging process, right, left and central windows are set to scan the edges of a runway, with a result that the data to be processed is decreased, and the processing is speeded up. The processing operations of these windows (small areas) are collected to recognize the entire contours of the runway, with a result that the runway can be recognized with high precision. When the central window detects a different edge of the runway, the backward processing is performed to detect scanning errors of the right and the left windows, with a result that the contour of the runway can be judged accurately and easily.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 12A-C are views explaining the initialization processing, and the setting of the windows;

FIG. 15A-D are views explaining the V-shape scanning processing related to a major part of a second embodiment of this invention.

DESCRIPTION OF THE PREFERRED EMBODIMENT

Figure 1A:
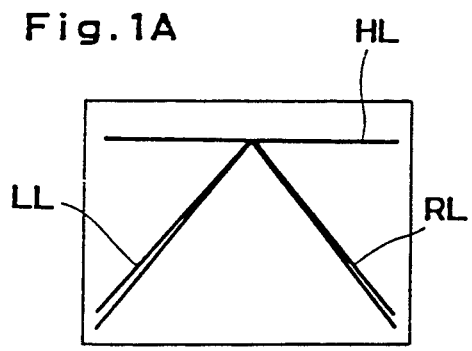
FIG. 1A-F are views of variations of a runway to be judged.
Figure 1D:
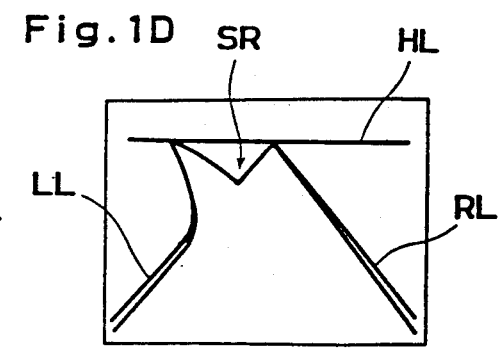
Figure 1B:
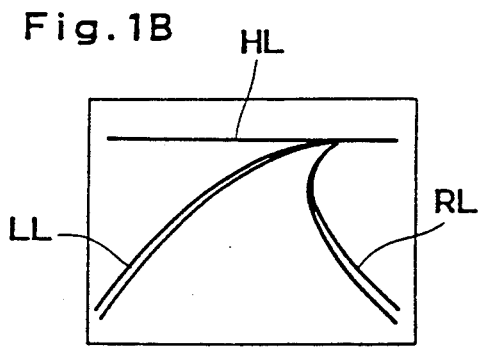
Figure 1E:
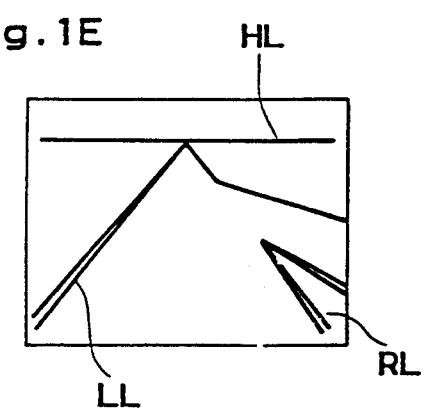
Figure 1C:
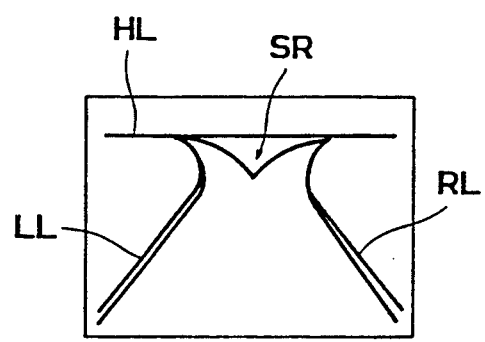
Figure 1F:
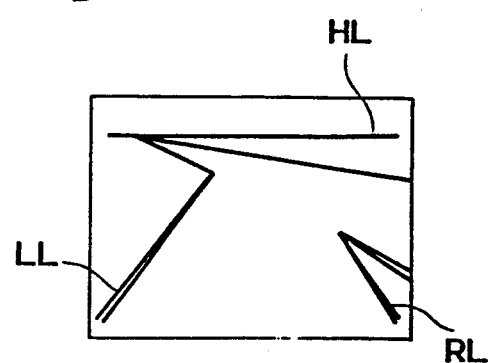
Figure 2:
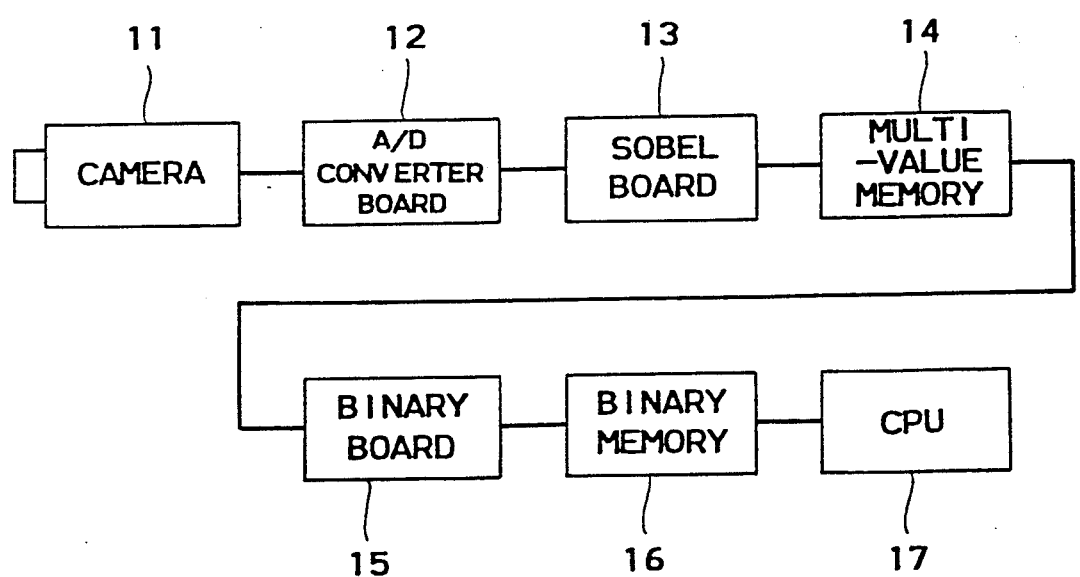
FIG. 2 is a diagrammatic view of a system for the runway judging process.

FIG. 2 is a block diagram of the system for the process according to the first embodiment. In FIG. 2, a camera 11 takes a picture of a road in the forward direction to supply an output of analog image data. This output is converted to 256 gradation-digital image data by an A/D converter board 12. Then the digital image data is space-differentiated by a Sobel board 13 so that parts, i.e., edges where the darkness of the image display abruptly changes are detected. The processing result of the Sobel board 13 is stored by a multivalued memory 14 in 256 gradations. Then the multivalued memory 14 supplies its stored data to a binary board 15 and is stored by a binary memory 16 in binary data (0, 1).

Figure 3:
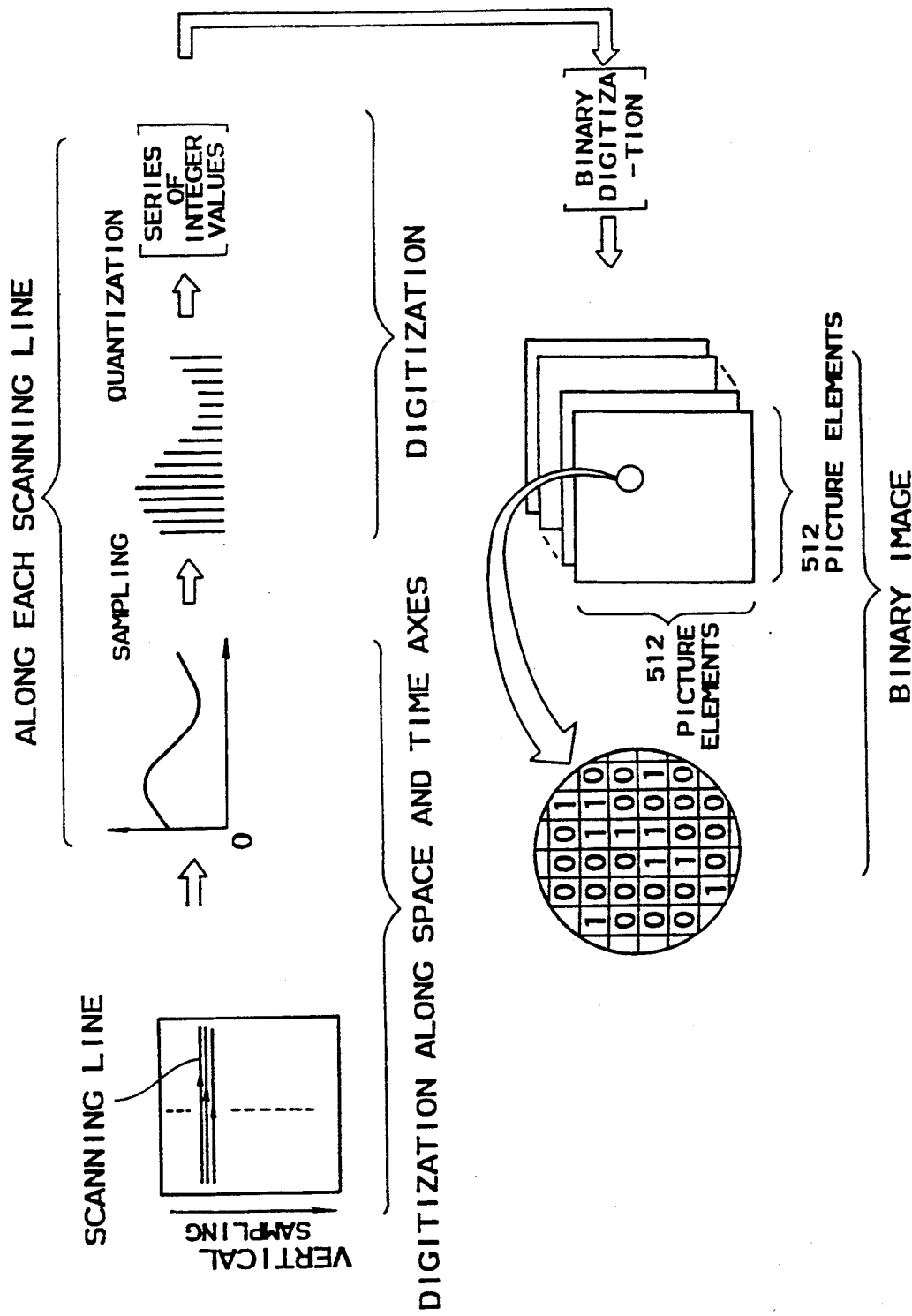
FIG. 3 is a view explaining the pre-processing in patterns.

The processing operations executed by the system from the camera 11 to the binary memory 16 are pre-processing performed by this invention. This pre-processing is shown in patterns in FIG. 3. A mobile analog image taken by the camera 11 is digitized first along the space and the time axes and then is digitized into 256 gradations with respect to the darkness. Subsequently the digitized image is two-valued to produce binary image data of 512×512 picture elements. The processing, i.e., main processing on this binary image data is performed by a CPU 17 in FIG. 2.

Next, before the main processing is explained, the tracing processing and the window processing used in the process for judging a runway according to this invention will be explained.

To process an image it is essential to extract a feature, e.g., a boundary line, etc. of an object from the image. One of the typical features on the image represents an edge. In this embodiment, for extracting an edge, an image is space-differentiated to detect the edge. The edge is detected at a position where a feature (generally gray level) abruptly changes, and the edge defines the boundary, i.e., contour of an object. To be specific, a white line i.e., a shoulder line of a road abruptly changes darkness on the image display, which permits the edge to be detected, and consequently a side of the road can be recognized.

Consecutive tracing processing:

An edge detected by extracting the feature is detected as a line by the following consecutive tracing processing.

(Step-i) Select a picture element for initiating a consecutive tracing processing operation;

(Step-ii) Scan a next picture element to be processed, based on an immediately preceding processed picture element, and perform required processing on the next picture element.

(Step-iii) Repeat Step-ii when a further next picture element is processed, or other wise finish the consecutive tracing processing operation.

This tracing processing is characterized firstly in that which picture element to be processed depends on a result, i.e., the position of an initial picture element, of the pre-processing preceding the tracing processing, and secondly in that the processing area can be restricted by using the result of the preceding pre-processing, with results that it is possible to remove wasteful processing and improve the processing precision.

Figure 4D:
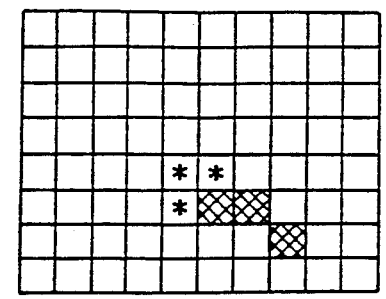
FIG. 4A-H are views explaining the edge tracing processing.
Figure 4C:
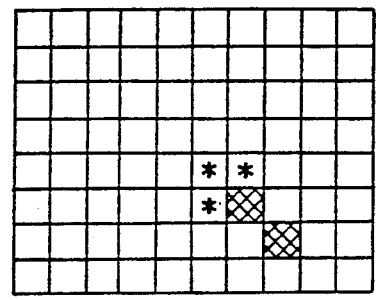
Figure 4B:
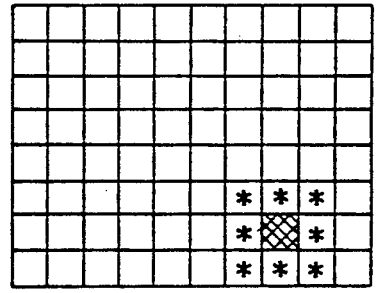
Figure 4A:
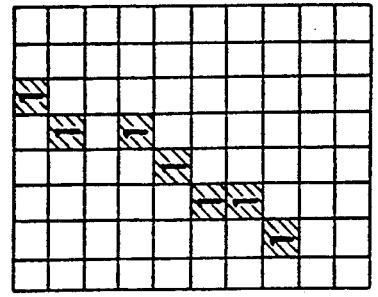
Figure 4H:
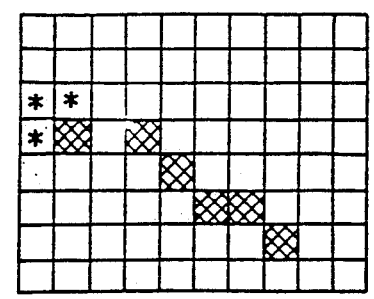
Figure 4G:
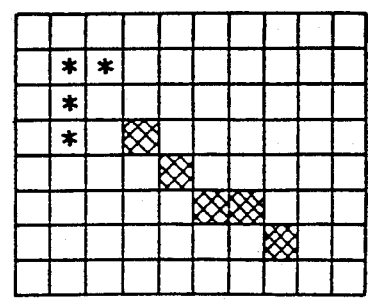

Examples of the tracing processing will be briefly explained with reference to FIGS. 4A–H. It is assumed that an edge to be traced (not "0" but "1" of binary data) are positioned as indicated by the hatchings in FIG. 4A. An initial picture element is chosen as indicated by the cross hatching in FIG. 4B to scan for the edge the picture elements which are continuous to this initial picture element. This scanning operation is performed on the picture elements marked by (*), and the edge is detected on a next picture element as in FIG. 4C. The next scanning operation for the edge is performed in an anticipated direction of the edge as indicated by the marks (*) in FIG. 4C. As indicated by FIGS. 4D, E and F, the scanning operation is repeated to detect the edge in the areas restricted by the processing results of the preceding scanning operations.

Figure 4F:
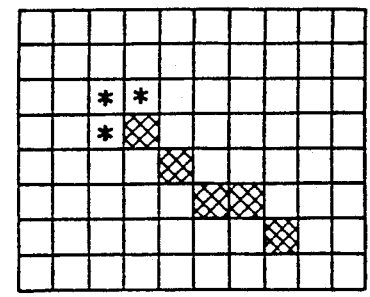
Figure 4E:
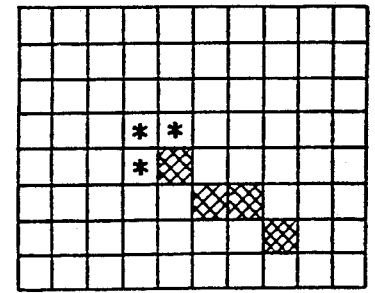

But, herein FIG. 4F, the edge is absent on the continuous picture elements, and the tracing processing operation cannot be performed. In this case, the scanning area is jumped by one picture element as in FIG. 4G. Then the edge can be detected as in FIG. 4H. Unless the edge can be detected even with one picture element jumped, two picture elements are jumped.

Window processing:

In this invention, an edge is not traced over the entire image display but over a part of the image display by window processing. This makes it possible to select for processing only a part of the image display where an object is present. In addition, in this invention, the contour of an object is extracted based on the above-described consecutive tracing processing.

(Step-i) Set a window to be processed, based on a picture element satisfying suitable conditions;

(Step-ii) Scan picture elements to be processed with the picture element in Step-i set as the initial picture element, and trace the edge to scan picture elements to be processed next;

(Step-iii) Repeat Step-ii when the traced picture element is inside the window. Return to Step-i to set an additional window when the traced picture element is outside the window. Jump some picture elements in the direction where the edge is anticipated to be present when the edge is interrupted, and horizontally scan the edge, (Step-iv) Repeat Step-ii.

This window processing is characterized in that; first, since this window processing uses the result of the preceding processing operation, it is possible to restrict the area of the window processing, and accordingly wasteful processing is removed; second, setting the processing window keeps the processing away from the influences of information outside the processing window; third, elaborate tuning can be performed depending on arrangements of the processing window; and, fourth, his window processing is effective for interrupted lines.

Next, an example of the consecutive small window tracing processing will be explained with reference to FIG. 5A-D.

Figure 5A:
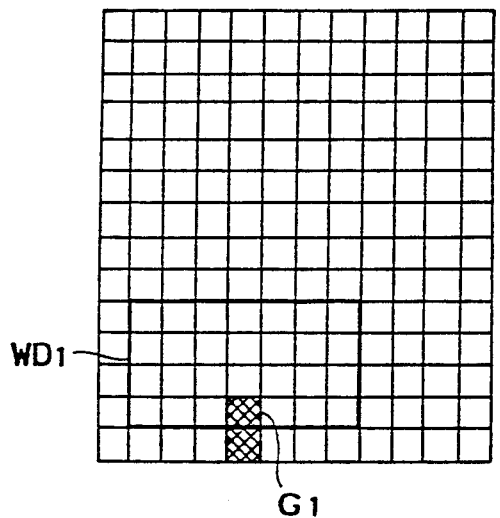
FIG. 5A-D are views explaining the consecutive small area tracing window processing.
Figure 5B:
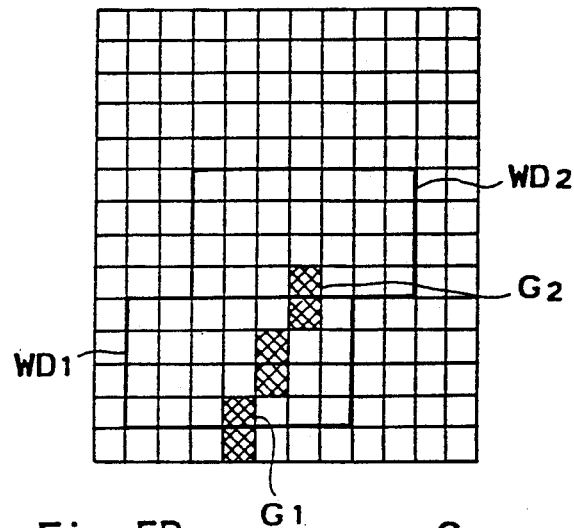
Figure 5C:
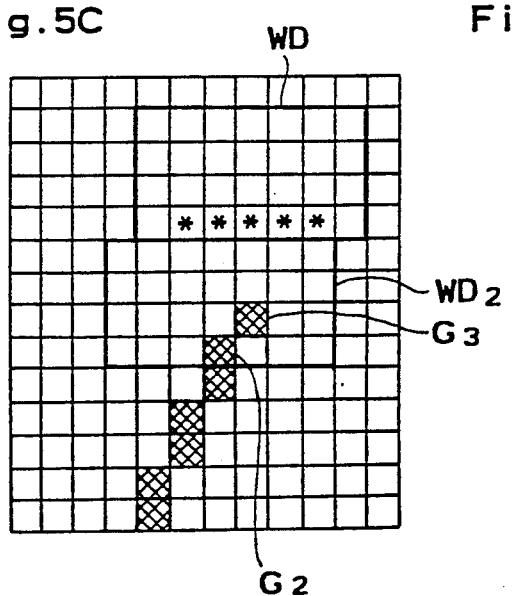
Figure 5D:
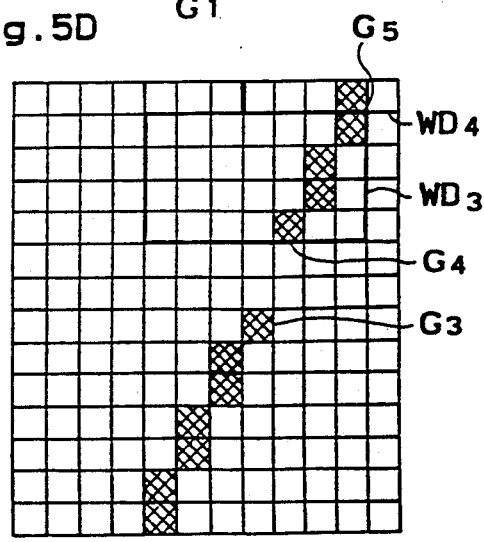

First, as shown in FIG. 5A, a window $WD_1$ is set with a picture element $G_1$, which has been traced in the preceding processing operation, centered. Then the tracing processing operation is repeated only in this window $WD_1$, and when a picture element $G_2$ which is the first outside the window $WD_1$ is determined, as shown in FIG. 5B, an additional window $WD_2$ is set with the picture element $G_2$ centered. The tracing processing operation is repeated by the window $WD_2$ in the same way as by the window $WD_1$. Here it is assumed that, as shown in FIG. 5C, the edge continuous to that of the picture element $G_3$ is detected neither on the adjacent picture elements nor on the picture elements jumped by one picture element. In this case, as shown in FIG. 5C, one additional window $WD_1$ is set above the window $WD_2$, and the edge is scanned on the picture elements indicated by (*) in FIG. 5C. Then the edge is detected on the picture element $G_4$ as in FIG. 5D. With the picture element $G_4$ set as a basic point, the scanning operation is repeated in the window $WD_3$. When a final picture element $G_5$ is detected in the window $WD_3$, an additional window $WD_4$ is set above the window $WD_3$.

Next, the main processing of the runway judging process according to this embodiment will be explained.

Figure 6:
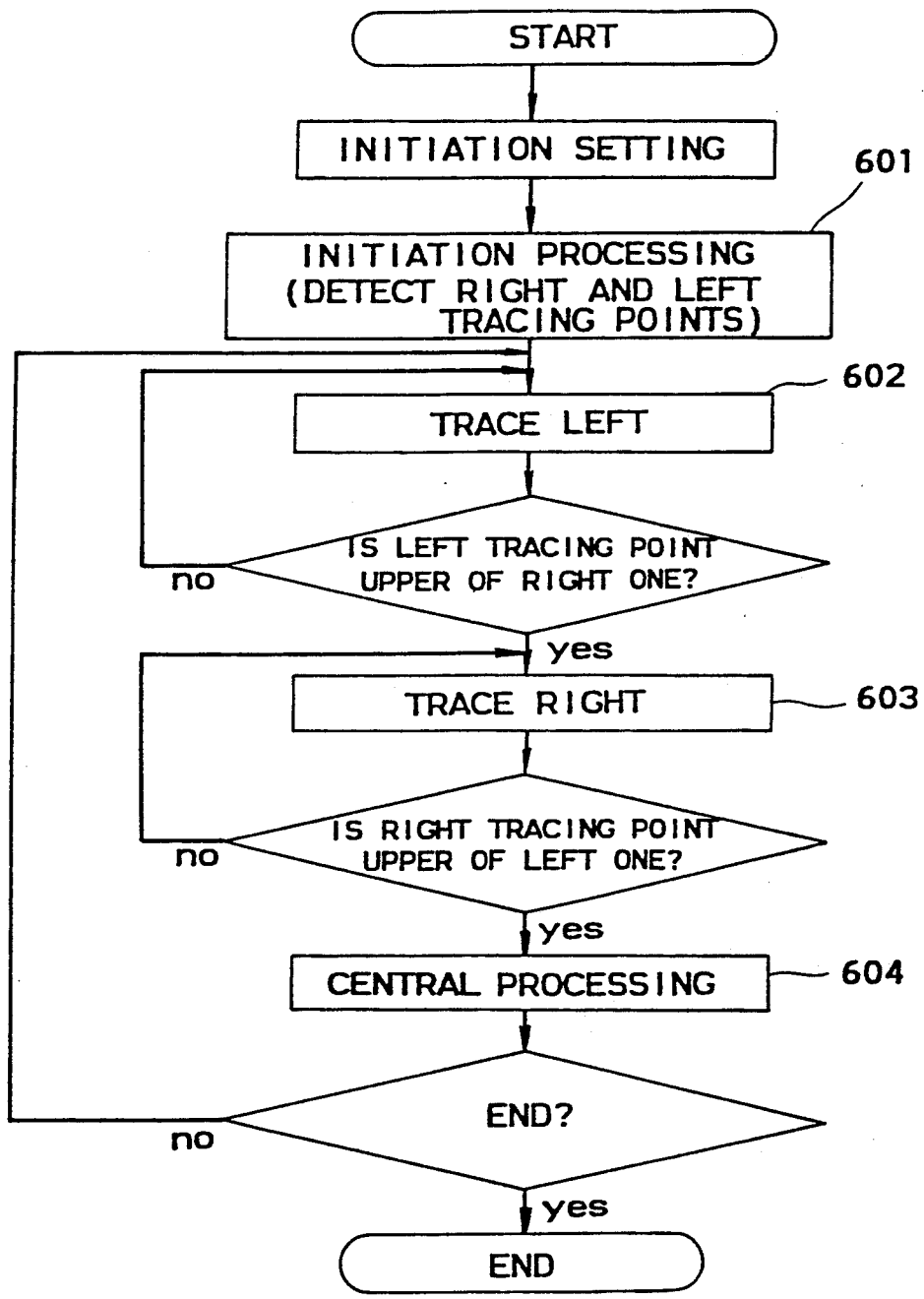
FIG. 6 is a flow chart of the general processing of the runway judging process according to the first embodiment.
Figure 7:
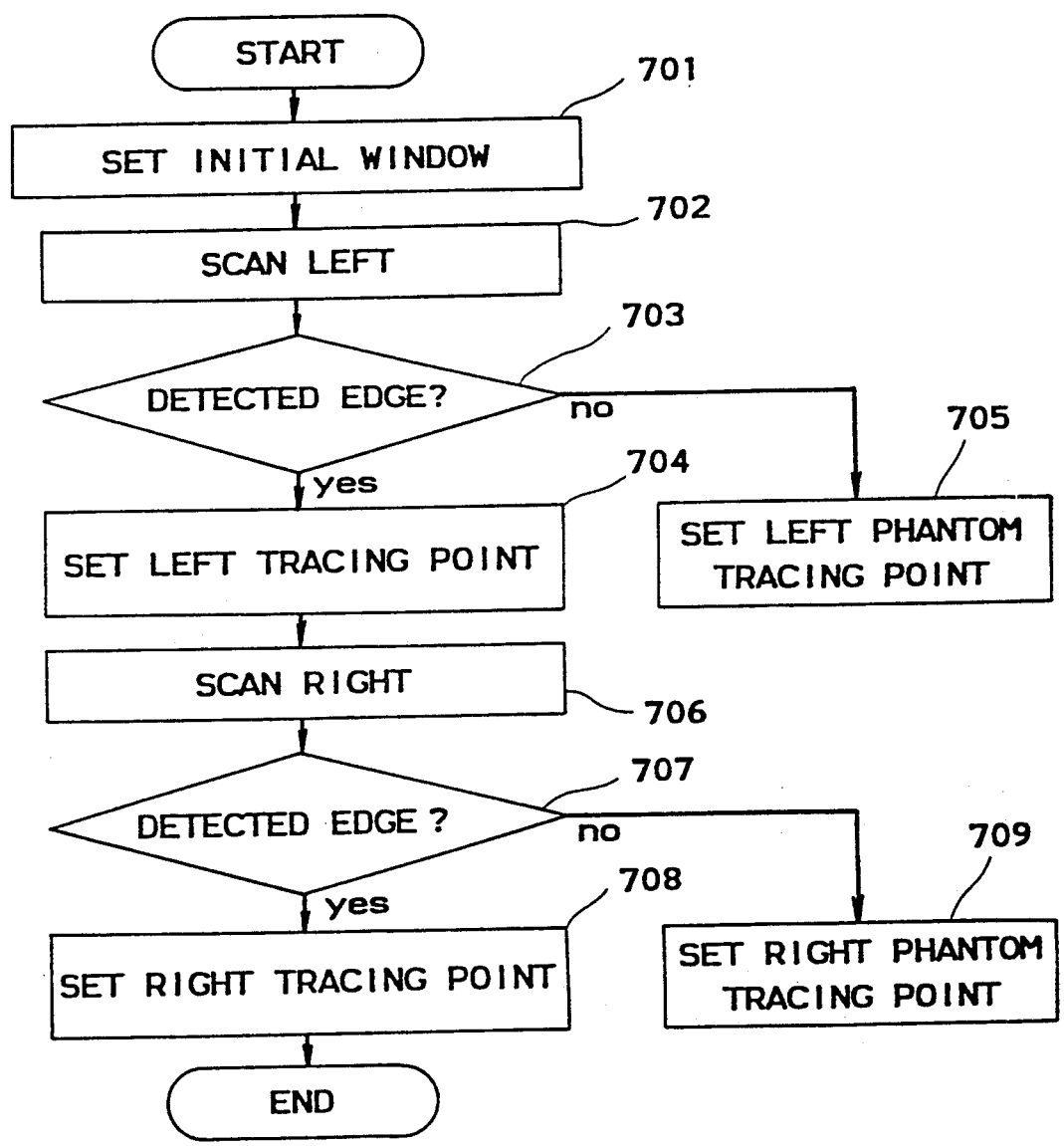
FIG. 7 is a flow chart of the initiation processing.
Figure 8:
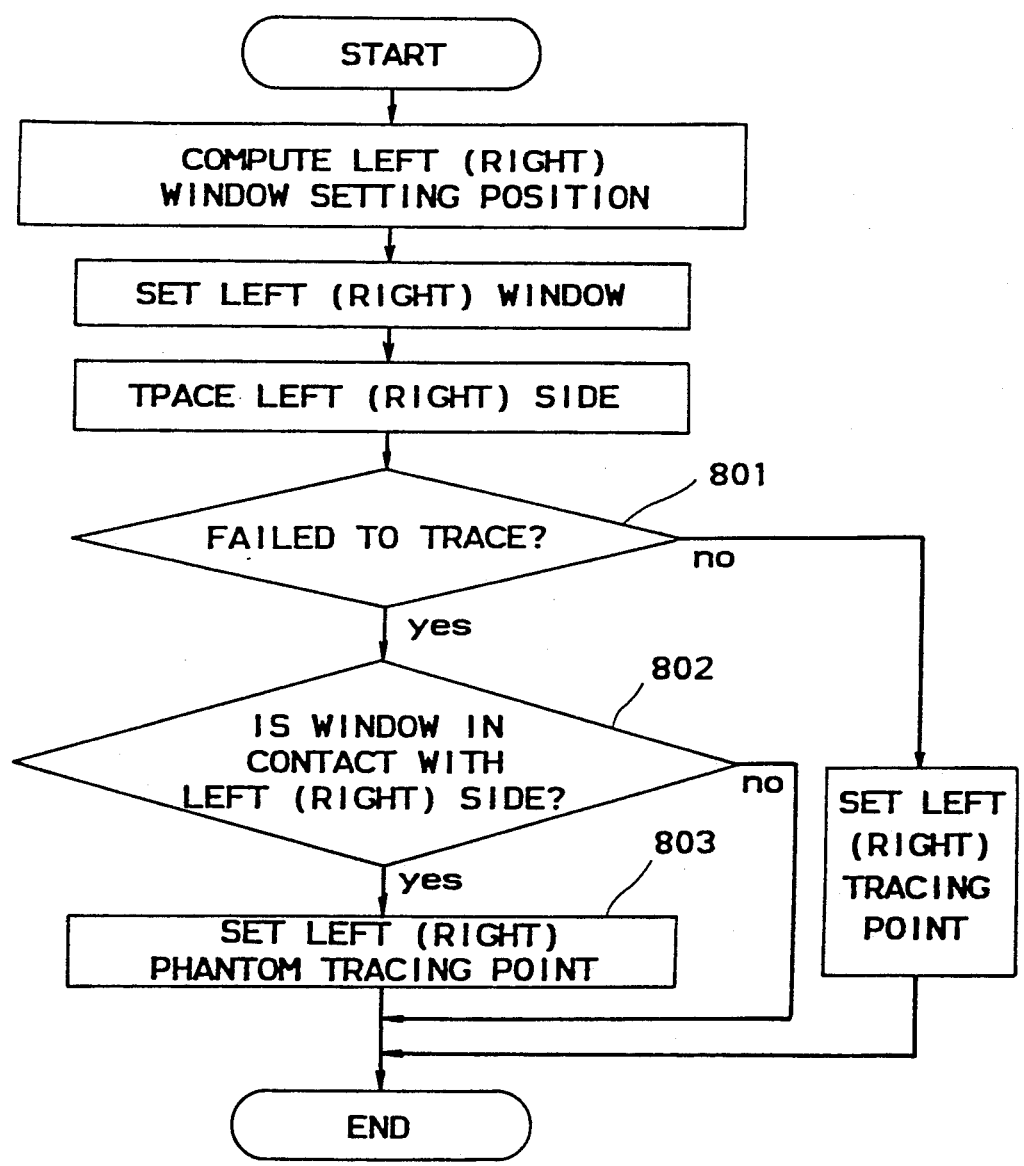
FIG. 8 is a flow chart of the left, (right) tracing.
Figure 10:
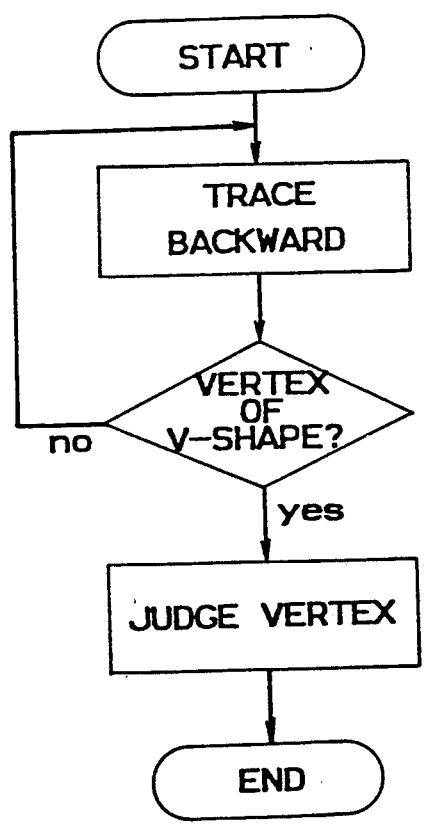
FIG. 10 is a flow chart of the backward processing.
Figure 11:
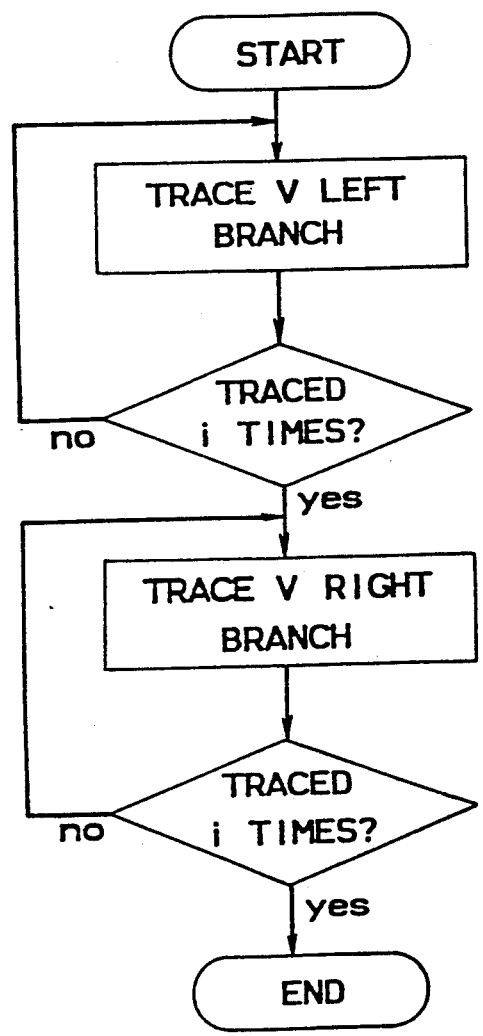
FIG. 11 is a flow chart of the V-shape scanning processing.

FIG. 6 is a general flow chart of the main processing. As shown, the main processing comprises initiation processing (Step 601) shown in detail in the flow chart of FIG. 7, left tracing and right tracing (Steps 602 and 603) including the left (right) side tracing shown in detail in the flow chart of FIG. 8, and center processing (Step 604) including center scanning detailed by the flow chart of FIG. 9. When the center scanning of Step 604 detects an edge, backward processing shown by the flow chart of FIG. 10 and V-shape tracing shown by the flow chart of FIG. 11 are executed.

The initiation processing will be explained in detail with reference to FIGS. 7 and 12A-C.

A camera 11 is placed on a road at a suitable height, When the camera 11 is faced in the direction of run of the road, the white lines on the right and the left sides of the road (the edges of the road RL, LL) are positioned respectively on the right and the left of the center of the image display as shown in FIG. 12A. Based on this natural arrangement, initial windows $WD_{OL'}$, $WD_{OR}$ are set respectively on the right and the left sides of the bottom of the image display (when a car is partially present in the image display, then immediately above the car) (Step 701 in FIG. 7). Then follow the processing operations of Steps 702–705 in FIG. 7, and those of Steps 706–709 of FIG. 7 continuously. That is, since the edges are absent inside the road, the interiors of the initial windows $WD_{OL'}$, $WD_{OR}$ are scanned outward from the respective sides away from to the center and the first edges to be detected are the sides of the runway in the form of the white lines (RL, LL). When a mass of some edges is detected, the edges are judged to be the white lines corresponding to the sides RL, LL of the runway, taking into consideration that there are actually small noises or interference present on the road, i.e., $G_b$, $G_c$ in FIGS. 12B and C (Steps 702 and 706).

When the edges in the form of the white lines of the road are detected, the upward, i.e., forward on the road, tracing starts and ends at the position immediately outside the initial windows $WD_{OL'}$, $WD_{OR}$. When one scanning operation cannot detect the edges, the same scanning operation is repeated within the initial windows $WD_{OL'}$, $WD_{OR}$ in an upper position by some picture elements until the edges are detected or the initial windows $WD_{OL'}$, $WD_{OR}$ run out. When the edges cannot be detected within the initial window $WD_{OL'}$, (Steps 703 and 707) as shown in FIGS. 12A and 12B, a phantom tracing point $E_{OL}$ is set at the upper outer corner of the initial window $WD_{OL}$, which means the edge has been detected (Steps 704 and 708). But this phantom tracing point $E_{OL}$ is not outputted in a line of points.

The left (right) tracing will be explained with reference to FIGS. 8, 12A-C and 13A and B.

Based on the edges, i.e., $E_{OL'}$, $E_{OR}$ in FIG. 12A, traced in the initiation processing, smaller right and left windows $WD_{IL'}$, $WD_{IR}$ are set respectively above the initial windows $WD_{OL'}$, $WD_{OR}$. The smaller right and the smaller left windows $WD_{IL'}$, $WD_{IR}$ are so set that initial picture elements are at the center of the bottom of the respective windows. In the following tracing operations, a small area is set in the same way as described above, based on the edge traced in their preceding operations. The right and the left windows $WD_{1L'}$, $WD_{2L'}$, ..., $WD_{1R'}$, $WD_{2R'}$ are made smaller than the initial windows $WD_{OL'}$, $WD_{OR}$ for decreasing the influence of noises. When set windows WD are partially out of the image display, the windows are set nearer to the center of the image display so as to be within the image display.

In a window WD, the above-described tracing processing is started on the initial picture elements and ends at a position immediately outside the window, and then additional windows are set. The scanning is performed basically in the unit of window alternately on the right and the left as shown in FIG. 6. The central processing which will be explained later is performed once every respective right and left tracing operation. A scanning operation ends when the edge is completely lost, or when numbers of set right and left windows reach preset numbers (they are counted from the position of the horizon). A phantom scanning point is set as in the initiation processing (Step 803) only when the edge has gone out of the image display at the right and the left sides thereof during a tracing operation of the edge (Step 802). This makes it possible to detect an edge which has gone out of the image display and returns again thereinto.

Figure 13A:
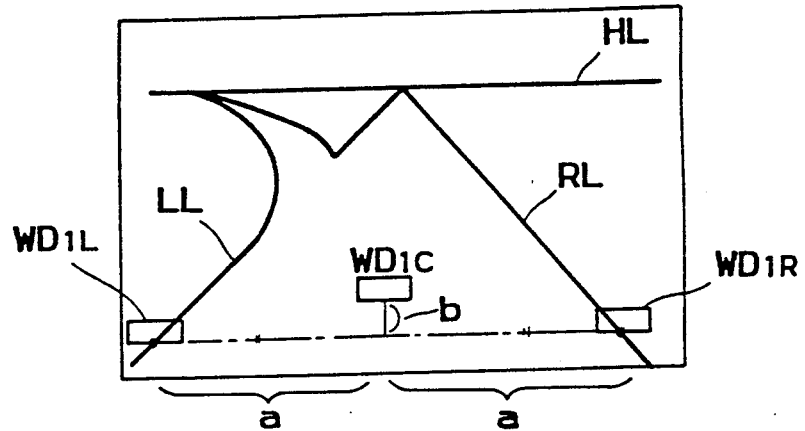
FIG. 13A-B are views explaining the setting of the central window, and the edge scanning.

Next, the central processing which is a major part of this invention will be explained with reference to FIGS. 9 and 13A and B.

Figure 9:
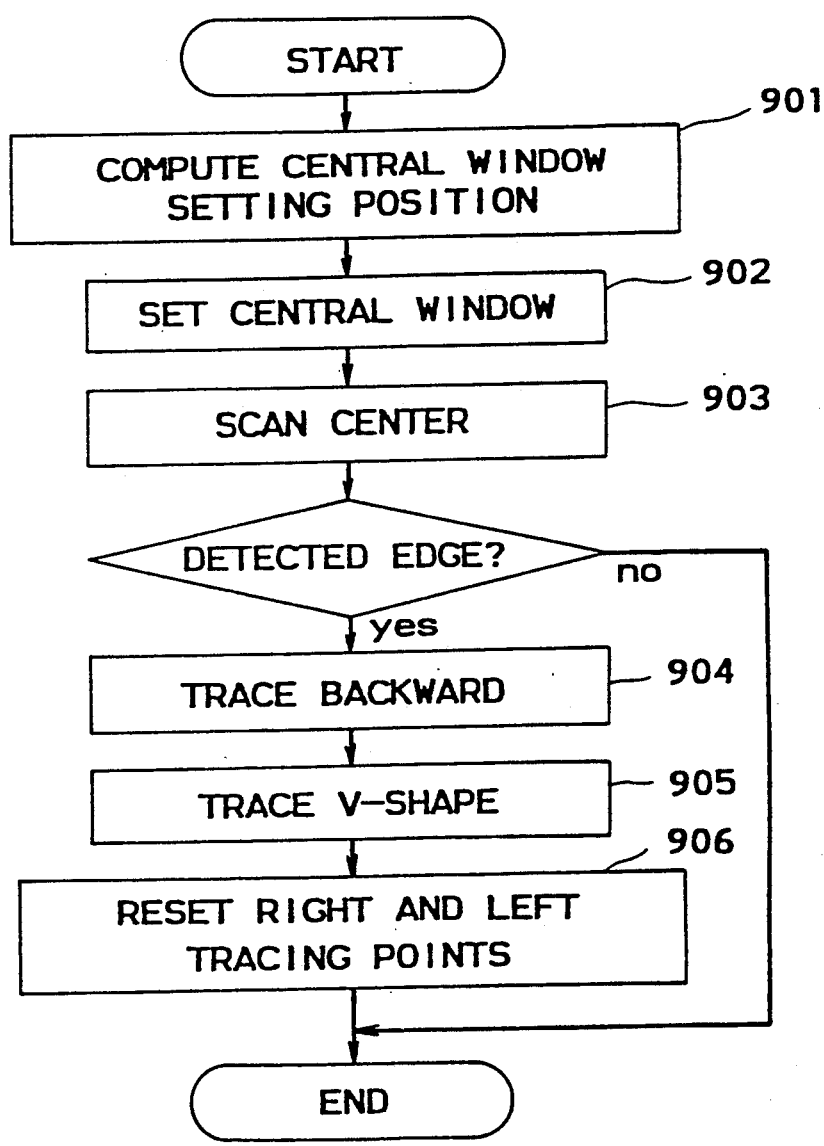
FIG. 9 is a flow chart of the central processing.
Figure 13B:
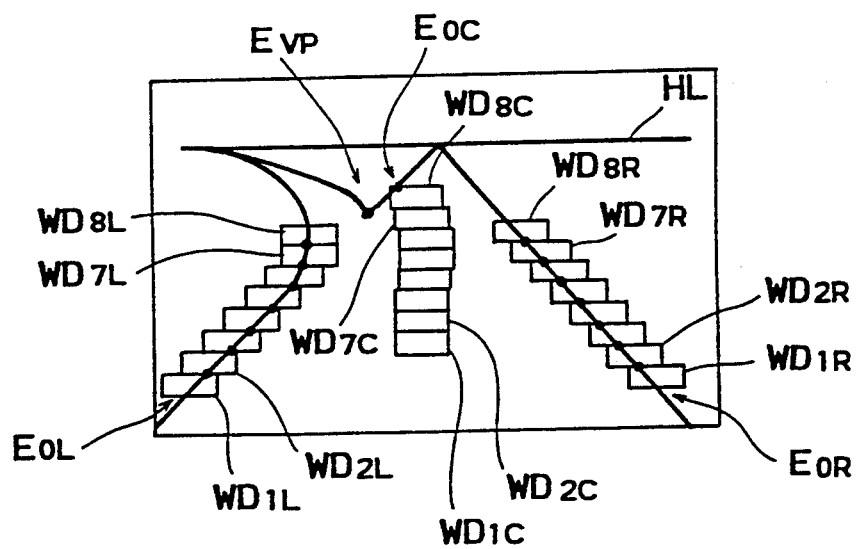

In the central processing in FIG. 9 are performed position computation for setting a central window position (Step 901), setting the central window (Step 902), and center scanning (Step 903). The central processing will be explained with reference to FIG. 13A and B. A position which is upper by "b" of a middle point between the right and the left windows $WD_{IL'}$, $WD_{IR}$ spaced from each other by "2a" on the image display is located, and at this position is set a central window $WD_{1C}$ (FIG. 13A. The scanning operation within the central window $WD_{1C}$ is basically the same as in the initiation processing but differs from the latter in the following two points. First, in the central processing, a scanning initial picture element is set at the upper left corner of the window $WD_{1C}$, and the scanning is performed to the right. Second, the scanning is jumped downward so as to speed up the processing. Every time one cycle of scanning ends, an additional central window $WD_{2C}$-$WD_{nC}$ are set as shown in FIG. 13B.

Figure 14:
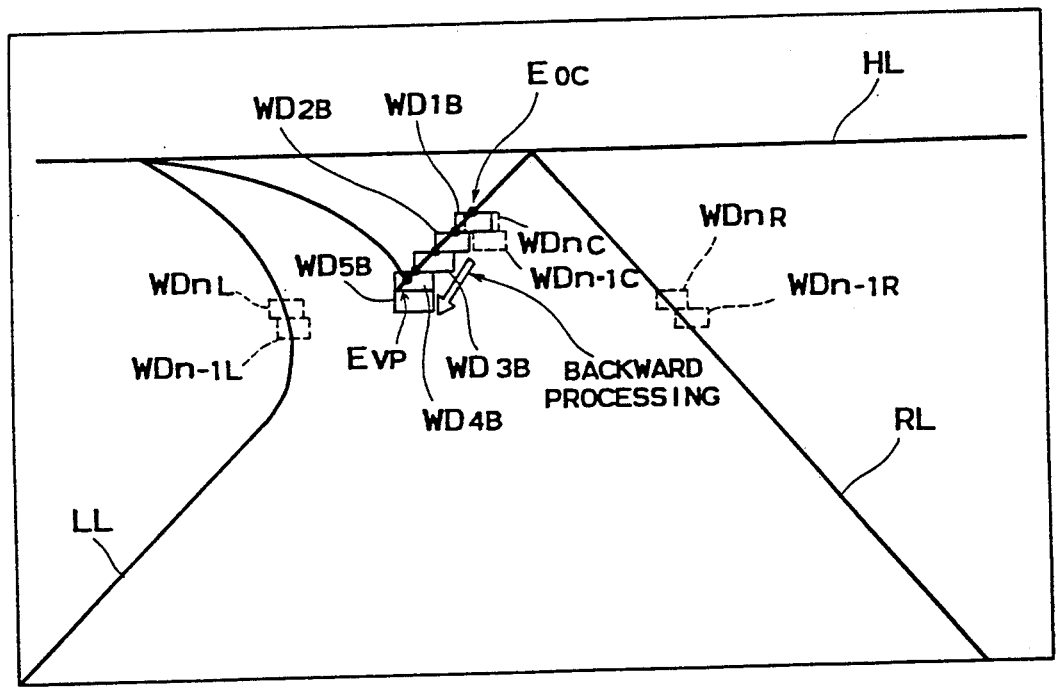
FIG. 14 is a view explaining a major part of the runway judging process according to a first embodiment of this invention.

The backward processing (Step 904) in FIG. 9 is executed as shown in FIG. 14.

This backward processing is for detecting the edge $E_{OC}$ by the central window $WD_{nC}$ as shown in FIG. 14 and tracing the edge downward for the purpose of detecting the edge $E_{VP}$ at the vertex of a V-shape. The edge $E_{OC}$, which as been detected by the central window, is traced downward by the backward processing by windows $WD_{1B}$-$WD_{4B}$, and when the vertex of the V-shape is detected, the backward processing ends. Meanwhile, on the other hand, the tracing operations by the right and the left windows $WD_{nL'}$, $WD_{nR}$ are at pause until the backward processing, and the V-shape and the right and left tracing points are reset. Whether or not the edge $E_{VP}$ is the vertex of the V-shape is determined by whether or not the edge continues downward on the image display. When the edge is interrupted, the position is judged to be the vertex. Whether or not the edge is interrupted is determined by setting one additional window ($WD_{5B}$) further downward from the position of the interruption and detecting none of the edge.

The V-shape tracing processing in FIG. 9 (Step 905), i.e., a major part of a second embodiment of this invention, is executed as shown in FIGS. 15A-B.

To extract the V shape in FIG. 15A, the window $WD_{1V}$ at the vertex of the V-shape is branched into upper right windows $WD_{2RV}$-$WD_{5RV}$ and upper left windows $WD_{2LV}$-$WD_{5LV}$ to trace edges as shown in FIG. 15C. The division of the tracing direction into the right and the left is detected by tracing first either of the right and the left picture elements. For example, in FIG. 15C, when the edge is traced to the left, the scanning operation is started on the picture element (1) in FIG. 15C, and a tracing operation is conducted in the direction of the picture element (2) first detected. When the edge is traced to the right, oppositely a scanning operation is started on the picture element (5), and a tracing operation is conducted in the direction of the picture element (4) first detected. The distance to be traced over is set minimum enough to recognize the contour of the V-shape, and in this embodiment 5 picture elements are set respectively on the right and the left sides.

In this embodiment, to recognize a branch in unity and simply, after one V-shape has been extracted, the right and the left edges of the road are set anew in accordance with the direction of drive inputted beforehand, and the tracing operation proceeds. Thus, even when there are some branches on one image display, these branches can be recognized one by one.

Figure 16A:
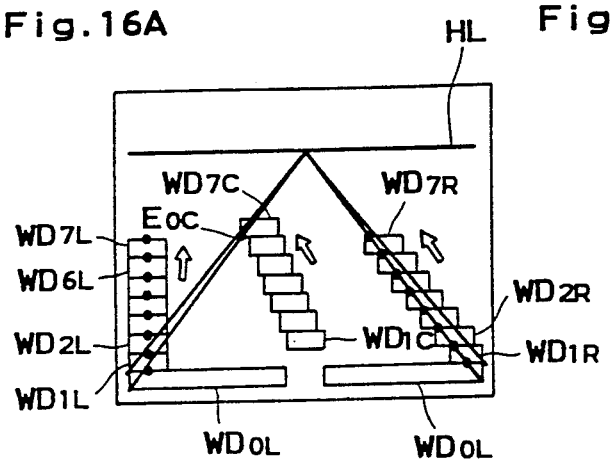
FIG. 16A-D are views explaining the scanning error detection performed by a major part of a third embodiment of this invention.
Figure 16B:
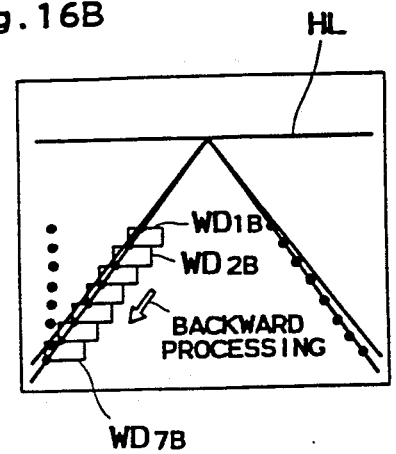

The backward processing executed by a major part of a third embodiment of this invention is as shown in FIG. 16A-B.

Figure 16C:
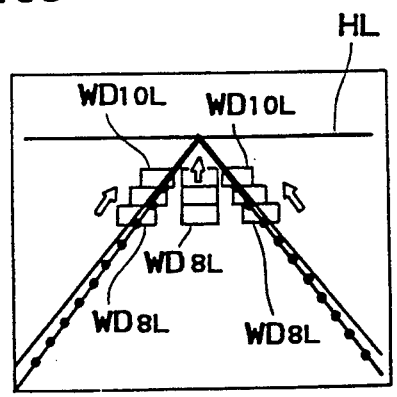
Figure 16D:
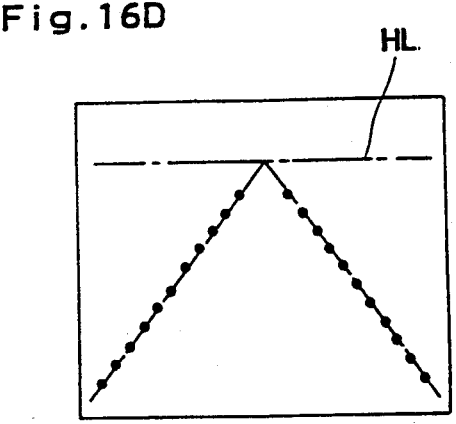

In this backward processing, an edge is detected by the scanning operation by a central window $WD_{7C}$ as shown in FIG. 16A, and a tracing operation is performed downward, as shown in FIG. 16B. This backward processing is for detecting the sides of a road which has escaped the processing by a left window, i.e., on the left side of the road the left window has failed to scan. That is, when a left window traces an edge outside the road due to a scanning error of the left window, as shown in FIG. 16A, a central window $WD_{7C}$ can detect the left edge, because the central window scans the center between the phantom scanning point of the left window and the edge detected by a right window. Then, the scanning operations by the right and the left windows are stopped, while the scanning by the central window continues downward along the left edge of the road, as shown in FIG. 16B to trace the edge down to the bottom of the image display. When a central window has conducted the tracing to the bottom of the image display, the position of the central window there is judged to be the left edge if it is left from the center of the image display, and when the position is right from the center of the image display, it is judged to be the right edge. The line of edge points (phantom scanning points) on the erroneous side (left side) is cut off, using the line of edge points traced by the backward processing. That is, the line of the edge points traced in the backward processing is the left side. Then, as shown in FIG. 16C, a scanning operation proceeds with an edge $E_{OC}$ set as a tracing initiating position of the left window. FIG. 16D shows the lines of the edge points given by the above-described processing.

The above-described scanning operation on one side of a runway is not limited to the left side but may be performed on the right side in the same way. The central windows can detect a scanning error when an intermediate right or left window fails to scan an edge as well as when it fails in the initial right or left window.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. A process for judging a runway on a two-dimensional image display presenting image information obtained by taking a picture of the runway, the process comprising:
    a first step of setting a first window and a second window for scanning and tracing required parts of the runway on the image display, and setting a third window located with respect to the first and the second windows in a set positioned relationship therewith; and
    a second step of, when the third window detects a required part of the runway, setting additional locations of a scanning area of the third window to the surrounding area of the required part of the runway.

2. A process for judging a runway according to claim 1, wherein the third window set in the first step is for scanning the required part of the runway between the first and the second windows.

3. A process for judging a runway according to claim 1, wherein the second step is for setting additional locations of the scanning area of the third window to the foreground.

4. A process for judging a runway for judging the contour thereof on a two-dimensional image display presenting image information obtained by taking a picture of the runway, the process comprising:
    a first step of setting a right window and a left window for scanning the right edge and the left edge of the runway respectively on the image display, and setting between the right and the left windows a central window for scanning a different edge of the runway;
    a second step of setting additional right and left windows respectively one after another in the direction of extension of the right and the left edges to scan and trace the right and the left edges in a scanning operation by the right and the left windows, and setting intermediate between the right and the left windows additional central windows one after another for scanning for the different edge of the runway; and
    a third step of, when one of the central windows detects the different edge of the runway, setting additional central windows on the foreground opposite to the detected direction of extension of the different edge so as to scan and trace and detect the detected different edge toward the foreground.

5. A process for judging a runway according to claim 4, wherein the third step is for, when one of the additional central windows detects the different edge of the runway, setting additional locations of the scanning area of the additional central window to the surrounding area of the detected different edge so as to detect the V-shape of the detected different edge.

6. A process for judging a runway according to claim 4, wherein the first step is for setting the central window a little forward on the runway between the right and the left windows.

7. A process for judging a runway according to claim 4, wherein the second step is for conducting the scanning operation and the setting operation of the additional right and left windows alternately on the right and the left sides.

8. A process for judging a runway according to claim 4, wherein the third step is for conducting the scanning and tracing operation of the additional central windows toward the foreground with the scanning operation of the right and the left windows on a pause.

9. A process for judging a runway according to claim 8, wherein the third step is for setting additional locations of the scanning area of the additional central windows to the foreground so as to detect the vertex of the V-shape.

10. A process for judging a runway according to claim 8 further comprising a fourth step of, when the detected different edge of the runway scanned and traced in the third step terminates, branching the scanning area at the vertex of the V-shape to the right and the left to scan and trace the detected different edge of the runway.

11. A process for judging a runway according to claim 10, wherein the fourth step is for conducting the branched tracing to the right and the left by a set number of windows.

12. A process for judging a runway on a two-dimensional image display presenting image information obtained by taking a picture of the runway, the process comprising:
    a first step of setting a first window and a second window for scanning and tracing required parts of the runway on the image display, and setting a third window located with respect to the first and the second windows in a set positional relationship therewith; and
    a second step of, when the third window detects a required part of the runway, setting additional locations of a scanning area of the third window to the surrounding area of the required part so as to detect possible errors of the scanning of the required parts conducted by the first and the second windows.

13. A process for judging a runway according to claim 12, wherein the third window set in the first step is for scanning a required part of the runway between the first and the second windows.

14. A process for judging a runway according to claim 12, wherein the second step is for expanding the scanning area of the third window to the foreground so as to detect possible errors of the scanning of the required parts.

15. A process for judging a runway for judging the contour thereof on a two-dimensional image display presenting image information obtained by taking a picture of the runway, the process comprising:
- a first step of setting a right window and a left window for scanning the right edge and the left edge of the runway respectively on the image display, and setting between the right and the left windows a central window for scanning a different edge of the runway;
- a second step of setting additional right and left windows respectively one after another in the direction of extension of the right and the left edges to scan and trace the right and the left edges in a scanning operation by the right and the left windows, and setting intermediate between the right and the left windows additional central windows one after another for scanning the different edge of the runway;
- a third step of, when one of the central windows detects the different edge of the runway, setting additional central windows on the foreground opposite to the direction of extension of the detected different edge so as to scan and trace the detected different edge toward the foreground; and
- a fourth step of, when the detected different edge being scanned and traced toward the foreground by the additional central windows emerges into either of the edges being scanned by the right and the left windows, judging the detected different edge as either of the right and the left edges.

16. A process for judging a runway according to claim 15, wherein the first step is for setting the central window a little forward on the runway between the right and the left windows.

17. A process for judging a runway according to claim 15, wherein the second step is for conducting the scanning operation and the setting operation of the additional right and left windows alternately on the right and the left sides.

18. A process for judging a runway according to claim 15, wherein the third step is for conducting the scanning and tracing operation of the additional central windows toward the foreground with the scanning operation of the right and the left windows on a pause.

* * * * *

UNITED STATES PATENT AND TRADEMARK OFFICE
CERTIFICATE OF CORRECTION

PATENT NO. : 5,097,329
DATED : March 17, 1992
INVENTOR(S) : HIROSHI HASEGAWA, RYOJI IGARASHI It is certified that error appears in the above-identified patent and that said Letters Patent is hereby corrected as shown below:

Claim 15, column 1, line 20, before "central" insert -- additional --.

Claim 15, column 2, line 5, delete the word "additional".

In the Abstract:

Line 10, delete "addition location" and insert -- additional locations --.

Signed and Sealed this

Twenty-eighth Day of September, 1993

Attest:

BRUCE LEHMAN

Attesting Officer

Commissioner of Patents and Trademarks